3,261,852
ADAMANTOATE ESTERS OF TESTOSTERONE
Richard T. Rapala, Indianapolis, Ind., assignor to Eli Lilly and Company, Indianapolis, Ind., a corporation of Indiana
No Drawing. Filed July 6, 1964, Ser. No. 380,627
4 Claims. (Cl. 260—397.4)

This invention relates to certain novel esters of testosterone and related compounds.

The compounds provided by this invention are testosterone 17β-(1-adamantoate), 19-nortestosterone 17β-(1-adamantoate), and 4-chlorotestosterone 17β-(1-adamantoate). They are esters of testostrene, 19-nortestosterone, and 4-chlorotestosterone with adamantane-1-carboxylic acid, which acid can be represented by the following formula:

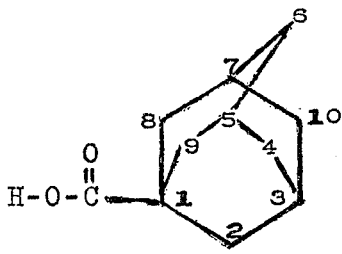

Also included within the scope of this invention as equivalent to the adamantane-1-carboxylic acid esters are the esters of the lower alkyl substituted adamantane-1-carboxylic acids such as 3-methyl and 3,5-dimethyladamantane-1-carboxylic acid.

The compounds of this invention have a surprisingly high myotrophic/androgenic ratio when compared with the parent alcohol from which they are derived and with other marketed nortestosterone and testosterone ester anabolic agents. This favorable ratio manifests itself in animals as an enhanced anabolic activity with a minimum of androgenic activity as compared with the parent compound. In animals, the myotrophic response of our novel esters is considerably delayed and/or prolonged, compared with the myotropic response to aliphatic esters of the same alcohols. In addition, the compounds of this invention are surprisingly void of antiestrogenic activity, whereas the parent alcohols are all three potent antiestrogenic agents.

The compounds of this invention are white, crystalline, high-melting solids, soluble in most organic solvents. They are prepared by standard esterification procedures using as the acylating agent either adamantanecarboxylic acid chloride or adamantanecarboxylic acid anhydride or the mixed anhydride of adamantanecarboxylic acid and trifluoroacetic acid, usually in the presence of a small quantity of pyridine or other tertiary amine as a catalyst.

The following examples will more fully illustrate the preparation of the compounds of this invention.

EXAMPLE I 4-chlorotestosterone 17β-(1-adamantoate)

A solution was prepared containing 450 mg. of 4-chlorotestosterone and 50 ml. of anhydrous benzene. A second solution containing 332 mg. of adamantanecarboxylic acid chloride in 5 ml. of anhydrous benzene was added, followed by 0.2 ml. of pyridine. The resulting reaction mixture was heated to refluxing temperature for about two hours. A mixture of water and ether was then added. The organic layer was separated, and was washed with a saturated sodium carbonate solution, then with water. The organic layer was again separated and was dried and the volatile constitutents were removed therefrom by evaporation in vacuo. The resulting residue, comprising 4-chlorotestosterone 17β-(1-adamantoate), was crystallized by dissolution in 90 ml. of ether, reducing the ether volume to about 15 ml. by boiling, and then cooling the resulting concentrate. The crystals thus obtained were recrystallized from acetone to yield 4-chlorotestosterone 17β-(1-adamantoate) melting at about 304–306° C. with decomposition. *Analysis.*—Calc.: C, 74.27; H, 8.51. Found: C, 74.31; H, 8.59.

EXAMPLE II

Preparation of 19-nortestosterone 17β-(1-adamantoate)

19-nortestosterone 17β-(1-adamantoate) was prepared by the procedure of Example I by substituting 384 mg. of 19-nortestosterone for the steroid of that example. 19-nortestosterone 17β-(1-adamantoate) thus obtained melted at about 204–206° C. *Analysis.*—Calc.: C, 79.77; H, 9.23. Found: C, 79.69; H, 9.30.

EXAMPLE III

Testosterone 17β-(1-adamantoate)

Testosterone 17β-(1-adamantoate) was prepared by the procedure of Example I except that 400 mg. of testosterone were substituted for the steroid of that example. Testosterone 17β-(1-adamantoate) thus prepared melted at about 217–220° C. *Analysis.*—Calc.: C, 79.95; H, 9.39. Found: C, 79.73; H, 9.44.

I claim:
1. A compound selected from the group consisting of 4-chlorotestosterone 17β-(1-adamantoate), 19-nortestosterone 17β-(1-adamantoate) and testosterone 17β-(1-adamantoate).
2. 4-chlorotestosterone 17β-(1-adamantoate).
3. 19-nortestosterone 17β-(1-adamantoate).
4. Testosterone 17β-(1-adamantoate).

References Cited by the Examiner
FOREIGN PATENTS
826,790  10/1960  Great Britain.

OTHER REFERENCES

Dorfman et al.: Androgens, pp. 116–128 (1960), John Wiley & Sons, New York.

Loewenthal: Tetrahedron, vol. 6, pp. 269–303 (1959), pages 299–303.

LEWIS GOTTS, *Primary Examiner.*

HENRY A. FRENCH, *Assistant Examiner.*